(12) United States Patent
Jun et al.

(10) Patent No.: US 9,530,182 B2
(45) Date of Patent: Dec. 27, 2016

(54) METHOD FOR DISPLAYING INFORMATION IN PARTICULAR IN A VEHICLE AND DISPLAY UNIT FOR A VEHICLE

(71) Applicant: VOLKSWAGEN AG, Wolfsburg (DE)

(72) Inventors: Mi-Ran Jun, Berlin (DE); Mathias Kuhn, Berlin (DE); Sönke Petersen, Berlin (DE); Alexander Hahn, Braunschweig (DE); Jian Lou, Berlin (DE)

(73) Assignee: Volkswagen AG, Wolfsburg (DE)

( * ) Notice: Subject to any disclaimer, the term of this patent is extended or adjusted under 35 U.S.C. 154(b) by 32 days.

(21) Appl. No.: 14/351,980

(22) PCT Filed: Oct. 9, 2012

(86) PCT No.: PCT/EP2012/004229
§ 371 (c)(1),
(2) Date: Apr. 15, 2014

(87) PCT Pub. No.: WO2013/053463
PCT Pub. Date: Apr. 18, 2013

(65) Prior Publication Data
US 2014/0300648 A1     Oct. 9, 2014

(30) Foreign Application Priority Data

Oct. 15, 2011 (DE) .................. 10 2011 116 141

(51) Int. Cl.
*B60K 37/06* (2006.01)
*G06T 3/20* (2006.01)

(52) U.S. Cl.
CPC ............... *G06T 3/20* (2013.01); *B60K 37/06* (2013.01); *B60K 2350/1012* (2013.01); *B60K 2350/906* (2013.01)

(58) Field of Classification Search
CPC ................ B60K 2350/1012; B60K 2350/906; B60K 37/06; G06T 3/20
See application file for complete search history.

(56) References Cited

U.S. PATENT DOCUMENTS

| 5,874,962 A | 2/1999 | De Judicibus et al. |
| 6,052,130 A * | 4/2000 | Bardon ............... G06T 11/60 345/666 |

(Continued)

FOREIGN PATENT DOCUMENTS

| CN | 102203710 A | 9/2011 |
| DE | 19941956 A1 | 3/2001 |

(Continued)

OTHER PUBLICATIONS

YouTube Channel: Birnenblog.de; Video: "Max OS X Lion—Gestures and Animations (Launchpad, Full-Screen Apps and MissionControl)"; Feb. 24, 2011; https://www.youtube.com/watch?v=QTX8ODbq6I1; Time Range—0:42 => 0:58.*

(Continued)

*Primary Examiner* — Jacinta M Crawford
*Assistant Examiner* — Jonathan M Cofino
(74) *Attorney, Agent, or Firm* — Barnes & Thornburg LLP

(57) ABSTRACT

A method for displaying information in a vehicle wherein a control device can generate graphics data which control a display surface such that, in a first display mode, graphic objects and/or buttons for visualizing information of a first vehicle unit are displayed and, in a second display mode, graphic objects and/or switches for visualizing information of a plurality of vehicle units are displayed. In a transition from the first display mode to the second display mode the representation of the graphic objects and/or buttons for visualizing information of the first vehicle unit are decreased in size and changed, and surface graphic objects and/or (Continued)

buttons for visualizing information of other vehicle units are redisplayed and the graphic objects and/or buttons for visualizing information of other vehicle units are moved. Also disclosed is a display unit for carrying out the method.

8 Claims, 4 Drawing Sheets

(56) References Cited

U.S. PATENT DOCUMENTS

| | | | | |
|---|---|---|---|---|
| 2002/0030699 | A1* | 3/2002 | Van Ee | G06F 3/0481 715/810 |
| 2008/0074550 | A1* | 3/2008 | Park | 348/565 |
| 2010/0106399 | A1* | 4/2010 | Waeller et al. | 701/201 |
| 2010/0110313 | A1* | 5/2010 | Souders et al. | 348/836 |
| 2010/0306702 | A1* | 12/2010 | Warner | 715/811 |

FOREIGN PATENT DOCUMENTS

| | | |
|---|---|---|
| DE | 102005020151 A1 | 11/2006 |
| DE | 102006032118 A1 | 1/2008 |
| DE | 102008048825 A1 | 3/2010 |
| DE | 102010012240 A1 | 9/2011 |
| JP | 10003375 A | 1/1998 |
| KR | 1020110084197 | 7/2011 |
| WO | 2010031454 A1 | 3/2010 |

OTHER PUBLICATIONS

YouTube Channel: Kevin Kerr; Video: "New Mac OS X 10.7 Lion—Mission Control Demonstration"; Oct. 20, 2010; https://www.youtube.com/watch?v=EmLUH-v4iOY; Time Range—1:07 => 1:13.*

Office Action for Korean Patent Application No. 10-2014-7012886; Apr. 1, 2015.

Search Report for International Patent Application No. PCT/EP2012/004229; Apr. 9, 2013.

Chinese Office Action for Chinese Application No. 201280050689.8, dated Dec. 3, 2015.

* cited by examiner

METHOD FOR DISPLAYING INFORMATION IN PARTICULAR IN A VEHICLE AND DISPLAY UNIT FOR A VEHICLE

PRIORITY CLAIM

This patent application is a U.S. National Phase of International Patent Application No. PCT/EP2012/004229, filed 9 Oct. 2012, which claims priority to German Patent Application No. 10 2011 116 141.8, filed 15 Oct. 2011, the disclosures of which are incorporated herein by reference in their entirety.

SUMMARY

Illustrative embodiments relate to a method for displaying information in a vehicle. In the method, a control device can generate graphics data which actuate a display area in such a way that in a first display mode graphics objects and/or control buttons for visualizing information of a first vehicle unit are displayed, and in a second display mode graphics objects and/or control buttons for visualizing information of a plurality of vehicle units are displayed. The display unit has a control device by means of which it is possible to generate graphics data for displaying graphics objects on a display area for visualizing information of a first vehicle unit in a first display mode, and graphics objects and/or control buttons for visualizing information of a plurality of vehicle units in a second display mode.

BRIEF DESCRIPTION OF THE DRAWINGS

Disclosed embodiments will now be explained with reference to the drawings, in which.

DETAILED DESCRIPTION OF THE DISCLOSED EMBODIMENTS

Figure 1:
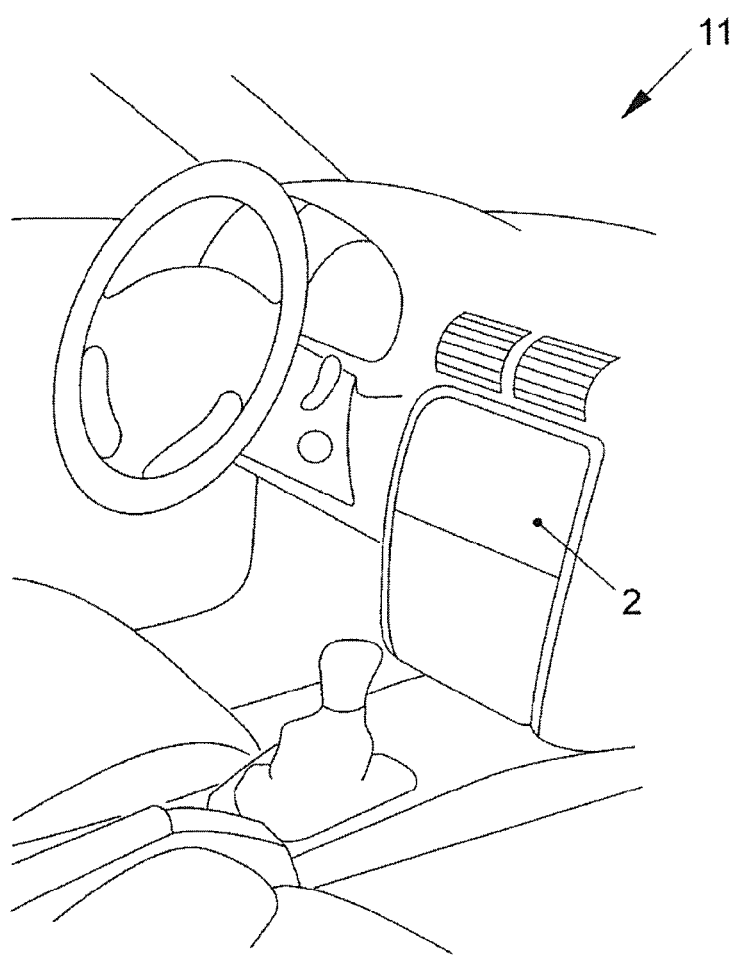
FIG. 1 shows a vehicle with the exemplary embodiment of the disclosed display unit.

Disclosed embodiments provide a method and a display unit in which information of vehicle units can be represented in such a way that it can be taken in quickly and intuitively by the viewer.

In the method, a transition from the first display mode into the second display mode the representation of the graphics objects and/or control buttons for visualizing information of the first vehicle unit is reduced in size and changed, and during this process graphics objects and/or control buttons for visualizing information of other vehicle units are newly displayed at the edge of the display area and these graphics objects and/or control buttons for visualizing information of other vehicle units are moved from the edge of the display area in the direction of the center of the display area.

In the second display mode, in particular, a home display, referred to as a home screen, or a display in a state of rest is represented. The method, therefore, relates in particular to the transition of the display of one application of a vehicle unit back to a home display. This transition is advantageously embodied in such a way that the user can very easily and intuitively orientate himself in the representation in the second display mode. Furthermore, information of the previous first display mode is represented. In addition, graphics objects or control buttons for other applications are displayed and can be moved from the edge of the display area into the display area. As a result, it is possible for the viewer, i.e. in particular the driver of the vehicle, to take in the information relating to the other vehicle units particularly easily and quickly since at the transition into the home state of the second display mode the same animation is always carried out. As a result, the method also contributes to safety when driving the vehicle. The driver of the vehicle is not distracted from the events on the road by taking in the displayed information.

According to at least one disclosed embodiment of the method, at the transition from the first display mode into the second display mode the representation of the graphics objects and/or control buttons for visualizing information of the first vehicle unit is changed in such a way that in the second display mode no control buttons are displayed any more. Alternatively, this representation can be changed in such a way that at least one subset of the control buttons displayed in the first display mode is displayed as display areas in the second display mode.

For purposes of the disclosed embodiments, the control button is a control element of a graphics user interface. A control button differs from elements and areas for pure information display, referred to as display elements or display areas, in that it can be selected. When a control button is selected, a function assigned to it is carried out. The function can only bring about a change in the information display. In addition, by means of the control buttons it is possible to control units whose operation is assisted by the information display. The control buttons can, therefore, replace conventional mechanical switches. The control buttons can be generated in any desired way for a freely programmable display area and can be displayed thereby. Furthermore, it is possible to provide that a control button can be marked. In this case, the assigned function is not yet carried out. However, the marked control button is represented in an emphasized way compared to other control buttons. The function assigned to the control button is not carried out until it is selected.

In this case, at the transition between the two display modes the technical function of a graphics object is also changed from a control button which represents an operator control element into a display area. This configuration also makes it easier for the viewer to orientate himself during the representation of information in the second display mode, since in the second display mode no operator control elements which are configured as control buttons are displayed any more but the graphics objects are at least partially still display areas.

According to a further disclosed embodiment of the method, at the transition from the first display mode into the second display mode the representation of the graphics objects and/or control buttons for visualizing information of the first vehicle unit is reduced in size in such a way that the side ratio remains the same and/or that the relative positioning of the graphics objects and/or control buttons which are displayed in the second display mode and which were also displayed in the first display mode remains the same. By virtue of this refinement, the viewer can also take in the represented information more intuitively and more easily, the information changing at the transition from the first display mode into the second display mode.

According to another disclosed embodiment of the method, in the second display mode in particular in each case a single graphics object is displayed for in each case one further vehicle unit. This graphics object may be, for example, what is referred to as a widget. This widget displays information on an application of the further vehicle units. The vehicle units can comprise any desired sensors which detect operating parameters of the vehicle which can be displayed on the display area. In addition, the vehicle units comprise a navigation system of the vehicle and the infotainment system. These systems comprise applications whose information is displayed by the widgets in the second display mode.

According to a further disclosed embodiment of the method, at the transition from the first display mode into the second display mode the graphics object and/or the control button for a further vehicle unit is moved in each case radially from the edge of the display area in the direction of a defined position of the display area. The graphics object or the control button is not moved here up to this position but instead only in the direction of this position. The defined position is in particular the center point of the display area. This refinement advantageously makes it easier for the viewer to take in information since the graphics objects or control buttons of the further vehicle unit move with the same pattern, in a star shape towards a specific vanishing point.

According to still another disclosed embodiment of the method, at the transition from the first display mode into the second display mode the graphics objects and/or control buttons for visualizing information of other vehicle units are included in the display. As a result, the information which appears new can be taken in more easily.

At a transition from the first display mode into the second display mode, the display unit generates graphics data in which the representation of the graphics objects and/or control buttons for visualizing information of the first vehicle unit is reduced in size and changed, and during this process graphics objects and/or control buttons for visualizing information of other vehicle units are newly displayed at the edge of the display area and these graphics objects and/or control buttons for visualizing information of other vehicle units are moved from the edge of the display area in the direction of the center of the display area.

The display unit can partially or completely carry out the method steps mentioned hereinabove. the display unit also has the same advantages as the disclosed method. Disclosed embodiments also relate to a vehicle having such a display unit.

Figure 2:
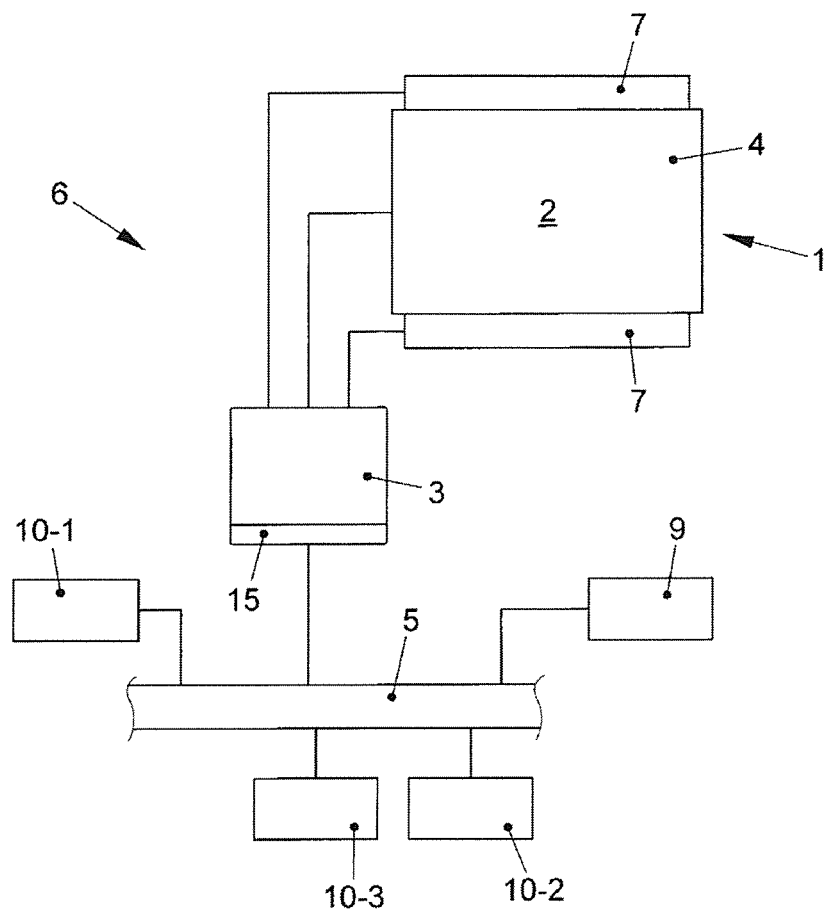
FIG. 2 shows a schematic view of an exemplary embodiment of the disclosed display unit and the connection of this display unit to other units of the vehicle.
Figure 3:
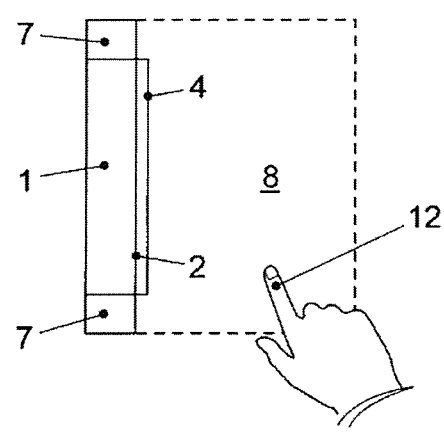
FIG. 3 shows a sectional view of the display device of the exemplary embodiment of the disclosed display unit.

Firstly, an exemplary embodiment of the display unit 6 and the arrangement thereof in a motor vehicle 11 will be explained with reference to FIGS. 1 to 3.

The display unit 6 comprises a display device 1 with a display area 2 which is arranged in the interior of the motor vehicle 11 in such a way that it is clearly visible to at least one vehicle occupant, in particular the driver. The display area 2 can be made available by a display, in particular a liquid crystal display, of any desired design.

The display unit 6 also comprises a control device 3 which is connected to the display device 1 with which graphics data for representing the information on the display area 2 can be generated. Furthermore, the display unit 6 is coupled to an input device which is embodied as a contact-sensitive surface 4 on the display area 2. What is referred to as a touch screen is therefore made available.

For example, a film can be arranged over the display area 2 and can be used to detect the position of contact of an activation object 12. The activation object is, in particular, the fingertip 12 of a user. The film can be embodied, for example, as a resistive touch film, capacitive touch film or piezoelectric film. In addition, the film can be embodied in such a way that a thermal, emanating, for example, from the fingertip 12 of a user, is measured. Various inputs can be acquired from the profile of the contact the film over time. For example, in the simplest case the contact of the film can be sensed at a specific position and assigned to a graphics object displayed on the display area 2. Furthermore, the length of contact at a specific position or within a specific region can be detected. A control button which can be activated can be displayed on the display area 2.

Furthermore, the display unit 6 is coupled to a proximity sensing device 7. By means of the proximity sensing device 7 it is possible to sense an activation object 12, for example the fingertip of a user, in a detection region 8. The detection region 8 is illustrated in detail in FIG. 3. The detection region 8 is formed in such a way that the movement of an activation object 12 towards the contact-sensitive surface 4 on the display area 2 is sensed.

In the exemplary embodiment described here, the detection region 8 forms at least one volume in front of the operator control surface 4. In particular a square is formed which, in the extent running parallel to the contact-sensitive surface 4, completely encloses the contact-sensitive surface 4 with its side surfaces. In a direction perpendicular to the contact-sensitive surface 4, the square extends from the contact-sensitive surface 4, or directly in front of the contact-sensitive surface 4, up to a distance of, for example, approximately 40 cm. The distance of the outer limit of the detection region 8 in front of the contact-sensitive surface 4 is selected here in such a way that movement towards the contact-sensitive surface 4 can be detected in such good time that the display on the display area 2 can be changed early enough to assist the user in an inputting process. In addition, the distance of the detection region 8 from the contact-sensitive surface 4 should be selected such that the activation object 12 or another object is moved as rarely as possible into the detection region 8 if there is no intention to operate the contact-sensitive surface 4.

Further details on various disclosed embodiments of the proximity sensing device 7 are described, for example, in WO 2011/051361 A1.

The proximity sensing device 7 continuously transmits the current position of an activation object 12 in the detection region 8 to the control device 3. The control device 3 can change the display on the display area 2 as a function of this signal.

Finally, the control device 3 is coupled via an interface 15 to a data bus 5. The control device 3 is connected via this data bus 5 to further units 9, 10-1, 10-2, 10-3 of the motor vehicle 11, information on which shall be displayed on the display area 2. Information can be displayed to the vehicle occupants using the display unit 6 and by means of the method.

An exemplary embodiment of the method which can be carried out by the display unit 6 described above is explained below in detail with reference to FIGS. 4 and 5:

The user can cause a first display mode to be displayed by means of an operator control process in a hierarchical menu structure which is displayed on the display area 2 by means of the contact-sensitive surface 4 in a manner known per se, in which first display mode graphics objects and control buttons of a specific vehicle unit 9 are displayed. In FIG. 4, for example, the display is represented on the display area 2 which belongs to a radio 9 of the vehicle 11. Graphics objects 13 and 14 which denote various radio transmitters are displayed, and the group to which these radio transmitters belong is displayed. In addition, various control buttons 16, 17, 20 which represent operator control elements for controlling the radio are displayed.

The user can then change the display mode by activating a separate operator control element, by means of a control button or in some other way. This changeover can also be brought about automatically and independently of the control device 3 if, for example, the display device 1 goes into a state of rest.

Figure 4:
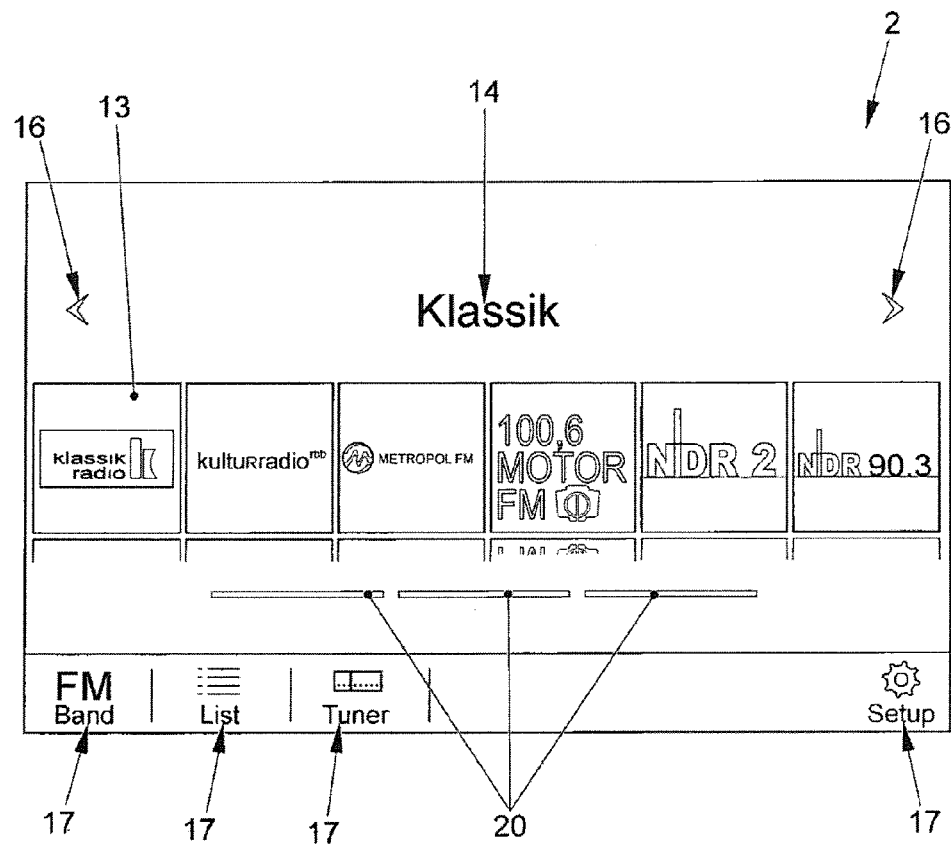
FIGS. 4 and 5 show displays which are represented by means of an exemplary embodiment of the disclosed method on the display area.

At the transition from the first display mode into the second display mode, the entire display, which is represented in the first display mode and is shown in FIG. 4, is reduced in size, wherein the side ratio of the display remains the same. At the same time, certain control buttons 16, 17 disappear. However, some of the control buttons 20 are converted into display areas, i.e. the display does not change in terms of these control buttons 20, but instead they can no longer be activated and therefore no longer constitute operator control elements. During the reduction in size and the changing of the display of the first display mode, graphics objects relating to other vehicle units 10-1, 10-2, 10-3 are included in the display at the edge of the display area 2 and subsequently moved from the edge of the display area 2 in the direction of the center of the display area 2. The graphics objects 19 are included in the display in this case at the positions of the edge of the display area 2 and moved in the direction of the center of the display area 2 in such a way that all the graphics objects 18, 19 of the second display mode are displayed in a clearly organized and easily readable fashion on the display area 2.

Figure 5:
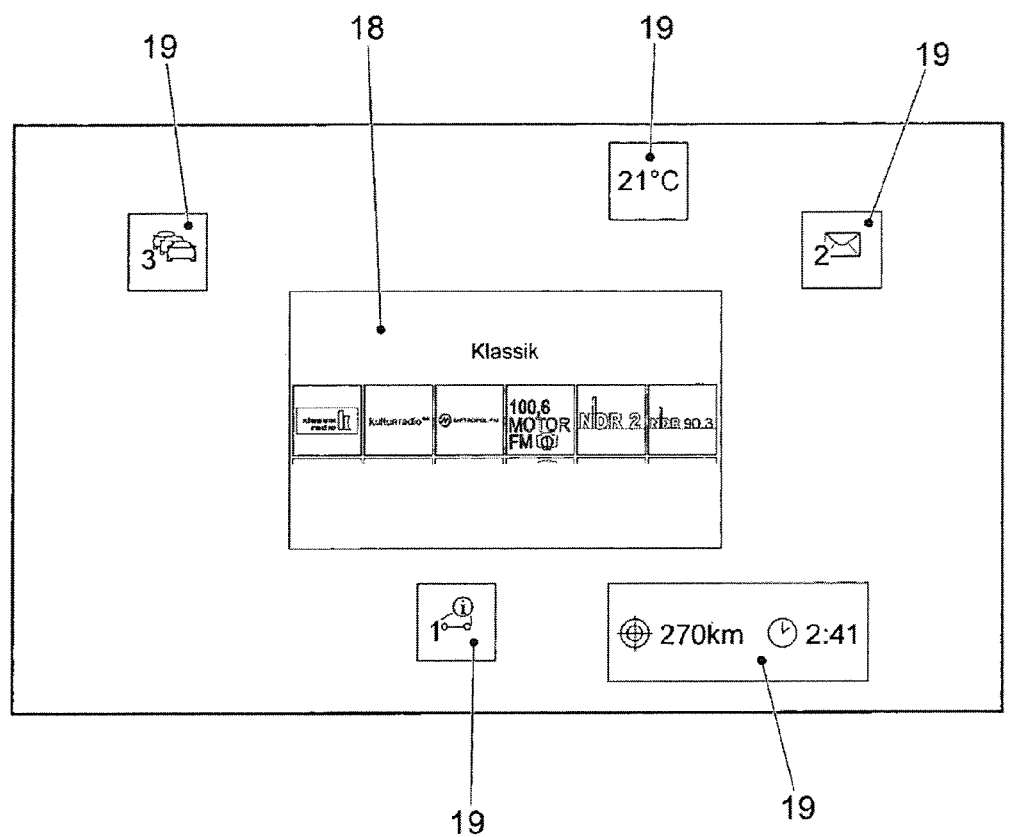

In FIG. 5, the final state of the transition from the first display mode into the second display mode is illustrated, i.e., the display on the display area 2 in the second display mode which represents a state of rest or home state. The graphics object 18 corresponds here to the preceding display relating to the radio 9 in the first display mode, but in the reduced and changed form. The further graphics objects 19 are widgets of other vehicle units 10-1, 10-2, 10-3. For example, the kilometer reading and the time passed since the start of the journey are represented. In addition, the current internal temperature or external temperature are displayed. Furthermore, it is displayed where new emails have been input via a radio interface. Finally, information on driver assistance systems and the operating parameters of the vehicle 11 can be displayed.

With the increase in electronic units in the vehicle, it has become necessary to represent a relatively large amount of information in the vehicle. Modern vehicles comprise, for example, not only a multifunction display but also a large number of driver assistance systems, the information of which has to be displayed in the vehicle. Furthermore, vehicles frequently comprise a navigation system. By means of such a navigation system it is possible to display digital geographic road maps with a route and, under certain circumstances, a wide variety of additional information. Finally, modern vehicles often comprise communication and multimedia applications, including a mobile telephone interface and units for playing back music and voice. The vehicle must also have a facility for displaying information for these applications.

To be able to display the wide variety of information in a flexible way, for example freely programmable displays are used which frequently also perform the function of representing conventional mechanical instruments. DE 10 2006 032 118 A1 describes, for example, a combination instrument for a motor vehicle which comprises a display with which the speed of the motor vehicle, the rotational speed of the engine of the motor vehicle, the temperature of the engine of the motor vehicle, the filling level of the fuel tank and/or the time can be displayed in a variable fashion. It is also possible to display information of a navigation system, of a telephone, of a music system, of an infotainment system and/or of an air-conditioning system.

In addition to the combination instrument, a display device is frequently arranged above the center console of the vehicle, by means of which display device further information can be displayed. This display device is used, in particular, as a multifunction display and for representing a geographic map of a navigation system. Such a multifunction display is described, for example, in DE 199 41 956 A1.

Displaying information in a vehicle involves very specific requirements. The information in the vehicle is taken in, inter alia, by the driver. The information should therefore be represented in the vehicle in such a way that the taking-in of information by the driver does not cause distraction while he is driving the vehicle. The information which is represented should therefore be capable of being taken in by the driver intuitively and quickly so that he only has to briefly avert his gaze from the events on the road to take in the information. If the operator control of the vehicle units is assisted or prompted by a display, the display should be provided in such a way that the driver only has to consider the display very briefly for the operator control to carry out the operator control.

LIST OF REFERENCE NUMERALS

1 Display device
2 Display area
3 Control device
4 Contact-sensitive surface, input device
5 Data bus
6 Display unit
7 Proximity sensing device
8 Detection region
9 Unit of the vehicle, radio
10-1, 10-2, 10-3 Unit of the vehicle
11 Motor vehicle
12 Activation object, fingertip
13 Graphics object
14 Graphics object
15 Interface
16 Control buttons
18 Graphics object
19 Graphics object
20 Control buttons

The invention claimed is:

1. A method for displaying information, in a vehicle, in which a control device generates graphics data which actuate a display area, the method comprising:

displaying, in a first display mode, graphics objects and/or control buttons for visualizing information of a first vehicle unit of a plurality of vehicle units;

wherein the each of the vehicle units corresponds to sensed operating parameters and/or functionality provided within the vehicle; and displaying, in a second display mode, graphics objects and/or control buttons for visualizing information of the plurality of vehicle units are displayed;

transitioning from the first display mode into the second display mode, wherein during the transition, the representation of the graphics objects and/or control buttons for visualizing information of the first vehicle unit is reduced in size and changed, and during this transition, graphics objects and/or control buttons for visualizing information of other vehicle units of the plurality of vehicle unit are newly displayed at an edge of the display area, wherein during the transition, these graphics objects and/or control buttons for visualizing information of the other vehicle units are moved from the edge of the display area in the direction of the center of the display area so as to transition into the second display mode, and wherein, at the transition from the first display mode into the second display mode, the representation of the graphics objects and/or control buttons for visualizing information of the first vehicle unit is changed such that, in the second display mode, no control buttons are displayed.

2. The method of claim 1, wherein, at the transition from the first display mode into the second display mode, the representation of the graphics objects and/or control buttons for visualizing information of the first vehicle unit is changed that at least one subset of the control buttons displayed in the first display mode is displayed as display areas in the second display mode.

3. The method of claim 1, wherein, at the transition from the first display mode into the second display mode, the representation of the graphics objects and/or control buttons for visualizing information of the first vehicle unit is reduced in size-such that the side ratio remains the same and/or that the relative positioning of the graphics objects and/or control buttons which are displayed in the second display mode and which were also displayed in the first display mode remains the same.

4. The method of claim 1, wherein, in the second display mode in each case, a single graphics object is displayed for in each case one further vehicle unit.

5. The method of claim 1, wherein, at the transition from the first display mode into the second display mode, the graphics object and/or the control button for a further vehicle unit is moved in each case radially from the edge of the display area in the direction of a defined position, in particular, the center point, of the display area.

6. The method of claim 1, wherein, at the transition from the first display mode into the second display mode, the graphics objects and/or control buttons for visualizing the information of other vehicle units are included in the display.

7. A display unit for a vehicle, the display unit comprising a control device by generates graphics data for displaying graphics objects and/or control buttons on a display area for visualizing information of a first vehicle unit in a first display mode, and graphics objects and/or control buttons for visualizing information of a plurality of vehicle units in a second display mode, wherein the each of the vehicle units corresponds to sensed operating parameters and/or functionality provided within the vehicle;

wherein, using the control device, at a transition from the first display mode into the second display mode, graphics data is generated in which the representation of the graphics objects and/or control buttons for visualizing information of the first vehicle unit is reduced in size and changed, and during this transition graphics objects and/or control buttons for visualizing information of other vehicle units of the plurality of vehicle units are newly displayed at the edge of the display area and these graphics objects and/or control buttons for visualizing information of other vehicle units are moved from the edge of the display area in the direction of the center of the display area so as to transition into the second display mode, and wherein, at the transition from the first display mode into the second display mode, the representation of the graphics objects and/or control buttons for visualizing information of the first vehicle unit is changed such that, in the second display mode, no control buttons are displayed.

8. A vehicle having a display unit as claimed in claim 7.

* * * * *